US007223950B2

(12) United States Patent
Nomura et al.

(10) Patent No.: US 7,223,950 B2
(45) Date of Patent: May 29, 2007

(54) MICROWAVE BURNING FURNACE INCLUDING HEATING ELEMENT HAVING TWO TYPES OF MATERIALS

(75) Inventors: Eiji Nomura, Tochigi (JP); Jun Nomura, Tochigi (JP); Motoyasu Sato, Shiga (JP)

(73) Assignees: Matsushita Electric Industrial Co., Ltd., Osaka (JP); National Institute for Fusion Science, Gifu (JP)

( * ) Notice: Subject to any disclaimer, the term of this patent is extended or adjusted under 35 U.S.C. 154(b) by 0 days.

(21) Appl. No.: 11/050,455

(22) Filed: Feb. 4, 2005

(65) Prior Publication Data

US 2005/0211705 A1 Sep. 29, 2005

(30) Foreign Application Priority Data

Feb. 5, 2004 (JP) ......................... P. 2004-029256

(51) Int. Cl.
*H05B 6/80* (2006.01)
*C04B 35/64* (2006.01)

(52) U.S. Cl. ...................... 219/679; 219/759; 219/756; 219/762; 219/757; 432/258; 419/48

(58) Field of Classification Search ................ 219/759, 219/679, 756–757, 762–763, 680–685; 432/258, 432/262; 419/48; 264/402–405, 432

See application file for complete search history.

(56) References Cited

U.S. PATENT DOCUMENTS 3,731,037 A * 5/1973 Levinson .................... 219/756

FOREIGN PATENT DOCUMENTS

| | | |
|---|---|---|
| JP | 2-275777 | 11/1990 |
| JP | 4-92870 | 3/1992 |
| JP | 4-278123 | * 10/1992 |
| JP | 6-345541 | 12/1994 |
| JP | 7-318262 | 12/1995 |
| JP | 10-158056 | 6/1998 |
| JP | 2002-130960 | 5/2002 |

* cited by examiner

*Primary Examiner*—Philip H. Leung
(74) *Attorney, Agent, or Firm*—McDermott Will & Emery LLP

(57) ABSTRACT

A microwave burning furnace including a housing constituted by a metal on which a microwave is to be irradiated, a metallic door provided in the housing, a burning chamber provided in the housing and surrounded by a material having a low microwave absorption characteristic and a high heat insulating property, and microwave generating means, wherein the burning chamber includes a heater element constituted by at least two types of heating materials having a heating material for a high temperature region which automatically generates a heat mainly in the high temperature region to have a burning temperature by an irradiation of a microwave and a heating material for a low temperature region which automatically generates a heat mainly in the low temperature region including an ordinary temperature.

8 Claims, 7 Drawing Sheets

MICROWAVE BURNING FURNACE INCLUDING HEATING ELEMENT HAVING TWO TYPES OF MATERIALS

BACKGROUND OF THE INVENTION

The present invention relates to a microwave burning furnace for burning an object to be burned which is formed by the material of a pottery or fine ceramics material, thereby manufacturing a burned product.

In recent years, it has been proposed to burn the material of a pottery or fine ceramics by microwave heating, and practical use has already been started.

In the case in which they are to be burned by the microwave heating, a microwave uniformly heats each portion of an object to be burned in principle if the object to be burned is homogeneous. In a burning process, however, an atmospheric temperature in a microwave burning furnace is much lower than the surface temperature of the object to be burned. For this reason, a heat is radiated from the surface of the object to be burned. As a result, a temperature gradient is generated between a central part and a surface in the object to be burned so that a crack is apt to be generated.

Referring to the characteristic of the microwave heating, furthermore, the dielectric loss of the same substance is increased when a temperature is higher. If the temperature gradient is once generated, accordingly, the microwave absorption efficiency of a portion having a high temperature is high and a difference in the microwave absorption efficiency is further increased so that partial and local heating is caused.

If the temperature gradient is once generated, thus, a difference in a temperature is more increased by the microwave heating. Consequently, the generation of the crack is promoted.

In the burning to be carried out by the microwave heating, moreover, there is also a problem in that an energy effect is obtained poorly by the microwave heating through temperature rising in a low temperature region in the case in which the material of the object to be burned uses, as a raw material, alumina or silica which is the main material of ceramics having a small dielectric loss at an ordinary temperature.

As a microwave burning furnace capable of suppressing the generation of the temperature gradient to reduce the generation of a crack, there has been proposed a microwave sintering furnace (see JP-A-6-345541) provided with a heater 24 in the microwave sintering furnace and serving to control a temperature in a microwave burning furnace by means of the heater 24 as shown in FIG. 11.

The microwave burning for ceramic can have various forms, for example, a form for burning an object to be burned such as ceramic through self-heat generation by a microwave and a form in which a heating unit for generating a heat by a microwave is provided close to an object to be burned and burning the object to be burned by the heat of the heating unit. The burning furnace according to JP-A-6-345541 takes the former form.

As a microwave burning furnace having the latter form, moreover, there has also been proposed a structure in which a peripheral wall is formed by a heating unit for carrying out self-heat generation through a microwave in a furnace as shown in FIG. 12 (see JP-A-2-275777). The burning furnace serves to accommodate a cylindrical vessel 25 formed by a microwave transmitting heat insulator in a microwave oven and to provide a cylindrical member 26 formed by a silicon carbide sintered body in the vessel 25, to set the inside of the cylindrical member 26 to be a sintering portion 27, to put an object to be burned therein, and to irradiate a microwave to cause the silicon carbide sintered body to generate a heat, thereby burning the object to be burned.

As a form using both of the forms together, there has been proposed a burning furnace (see JP-A-7-318262) having a heat generating vessel containing a substance having a great microwave loss as a main component and a heat insulator serving to cover the outside of the heat generating vessel and containing a substance having a small microwave loss as a main component, the heat generating vessel being provided with an opening, and furthermore, having a microwave irradiating device for irradiating a microwave toward the heat generating vessel through the heat insulator and irradiating the microwave toward an object to be burned in the heat generating vessel through the opening of the heat generating vessel. This can relieve a temperature distribution in the direction of a thickness.

Furthermore, there has been proposed a burning furnace (see JP-A-2002-130960) comprising a burning chamber 56 divided to surround the whole periphery of an object 50 to be burned by means of a blanket 55 capable of automatically generating a heat by a microwave, and microwave generating means 52 for irradiating a microwave on the object to be burned which is provided in the burning chamber 56, wherein the amount of heat generation per unit volume of the blanket 55 through the microwave is larger than the amount of heat generation per unit volume of the object to be burned and a surface temperature in the blanket 55 and that of the object 50 to be burned are substantially equal to each other as shown in FIG. 13.

It was found that the object to be burned can be heat insulated falsely and completely by perfectly surrounding the periphery of the object to be burned through a blanket having a microwave absorbing characteristic which is equivalent to the object to be burned in the burning through the microwave. In this case, it was supposed that the generation of a thermal gradient on the object to be burned by radiant cooling can be suppressed and the burning can be carried out still more uniformly. In the case in which the object to be burned is surrounded by the blanket and is thus burned, the energy of the microwave is also absorbed into the blanket as well as the object to be burned and is thus consumed. For this reason, there is a problem in that the amount of an energy required for the burning is increased considerably.

In order to reduce the amount of the energy consumed by the blanket, the amount of a thermal energy lost from the blanket toward an outside is larger than that given to the blanket through the microwave if the thickness of the blanket is reduced. For this reason, a great difference in a temperature is made between the inner surface of the blanket and the object to be burned. In order to solve the problem, therefore, there has been proposed a burning furnace capable of suppressing the generation of the thermal gradient over the object to be burned by the radiant cooling while reducing the amount of the energy required for the burning of the object to be burned.

The problem is solved by means in which the amount of heat generation per unit volume of the blanket through the microwave is larger than that per unit volume of the object to be burned and the surface temperature of the inside of the blanket and the surface temperature of the object to be burned are substantially equal to each other.

In the structure in which the heater 24 capable of independently executing a heat treatment is additionally provided as in the microwave burning furnace in JP-A-6-

345541, the temperature rising in a low temperature region which is hard to perform through the microwave heating is compensated by heating through the heater 24 so that it is also possible to carry out the burning for the object to be burned having a small dielectric loss at an ordinary temperature. Thus, it is possible to improve an energy efficiency required for the burning.

By covering the blanket dividing the burning chamber with another blanket having an excellent heat insulating property as described in JP-A-2002-130960, moreover, it is possible to enhance the heat insulating property around the burning chamber and to suppress the generation of a temperature gradient due to heat radiation.

In the technique in each of the Documents, however, there is a problem in that the structure of the microwave burning furnace is complicated and a cost is thus increased.

More specifically, in case of the technique in JP-A-6-345541 in which the heater is additionally provided, the heater is exposed to a burning temperature region having a very high temperature. For this reason, it is necessary to cause the heater to have a very high heat resistance. Consequently, it is impossible to employ a sheath type heater which is comparatively inexpensive and has an excellent performance. Moreover, a lead wire for supplying a power to the heater penetrates through a cavity. Therefore, it is necessary to employ a microwave sealing structure for sealing the leakage of a microwave in the penetrating portion, and furthermore, the insulating treatment of the lead wire and the cavity. Furthermore, there is also a problem in that power supplies having large capacities are to be mounted for supplying a power for a microwave generator and a heater respectively. These problems cause a drawback that the structure is complicated and the cost is increased.

In case of JP-A-2002-130960, moreover, some advantages can be obtained for suppressing the generation of the temperature gradient and there is also a problem in that an effect for an improvement in an energy efficiency in the temperature rising in the low temperature region is poor.

SUMMARY OF THE INVENTION

In consideration of the problems described above, it is an object of the invention to provide a microwave burning furnace capable of efficiently implementing each of temperature rising in a low temperature region and temperature rising in a high temperature region by only microwave heating and effectively preventing the generation of a temperature gradient in an object to be burned in a burning process, and furthermore, carrying out stabilization on a microwave basis and simplifying a structure, thereby reducing a manufacturing cost.

The invention solves the problems by the following means.

(1) A microwave burning furnace comprising a housing constituted by a metal on which a microwave is to be irradiated, a metallic door provided in the housing, a burning chamber provided in the housing and surrounded by a material having a low microwave absorption characteristic and a high heat insulating property, and microwave generating means, wherein the burning chamber includes a heater element constituted by at least two types of heating materials having a heating material for a high temperature region which automatically generates a heat mainly in the high temperature region to have a burning temperature by an irradiation of a microwave and a heating material for a low temperature region which automatically generates a heat mainly in the low temperature region including an ordinary temperature.

(2) The microwave burning furnace according to the (1), wherein the heater element is constituted by at least two types of materials including a heating material for a low temperature region which takes a larger amount of heat generation than an amount of heat generation of the heating material for a high temperature region from the low temperature region including an ordinary temperature to a region which is less than the high temperature region to have a burning temperature and a heating material for a high temperature region taking an amount of heat generation which is equal to or larger than the amount of heat generation of the heating material for a low temperature region in the high temperature region to have the burning temperature.

(3) The microwave burning furnace according to the (1) or (2), wherein the heater element has a main part formed by the heating material for a high temperature region and the heating material for a low temperature region is partially incorporated therein.

(4) The microwave burning furnace according to any of the (1) to (3), wherein the burning chamber has a plural-heater element constituted by at least two types of heating materials having a heating material for a high temperature region and a heating material for a low temperature region, and a single-heater element constituted by a single heating material to be the heating material for a low temperature region or the heating material for a high temperature region.

(5) The microwave burning furnace according to any of the (1) to (3), wherein the burning chamber has a plural-heater element constituted by at least two types of heating materials having a heating material for a high temperature region and a heating material for a low temperature region and at least two plural-heater elements having different quantities of the heating material for a low temperature region in the plural-heater element.

(6) The microwave burning furnace according to any of the (1) to (3), wherein the heater element is provided in the burning chamber and is constituted removably.

(7) The microwave burning furnace according to any of the (1) to (3), wherein the heater element forms a configuration of a blanket carrying out a division to surround an object to be heated.

In the invention, the burning chamber is characterized by the heater element including at least two types of heating materials, for example, the heating material for a high temperature region which automatically generates a heat mainly in the high temperature region to have the burning temperature by the irradiation of a microwave and the heating material for a low temperature region which automatically generates a heat mainly in the low temperature region including an ordinary temperature, and the heater element including at least two types of heating materials will be hereinafter referred to as a "plural-heater element".

In the burning furnace according to the invention, when the microwave is irradiated from the microwave generating means, the temperature of the object to be burned in the burning chamber is raised by the microwave heating together with the heater element through the microwave transmitted through the partition wall.

In such a burning process, in the temperature rising in the low temperature region at an early stage of the heating carried out by the microwave heating, the heating material for a low temperature region in the heater element generates a heat at a high energy efficiency so that a rise in an ambient temperature is quickened. When the microwave heating is progressed so that the temperature of the partition wall is raised to a predetermined high temperature region, the heating material for a high temperature region which is another formation material of the heater element generates a heat at an original high energy efficiency, thereby raising the ambient temperature.

In addition, the temperature rising in the low temperature region and the temperature rising in the high temperature region are carried out at high energy efficiencies by the heating material for a low temperature region and the heating material for a high temperature region, respectively. The ambient temperature is stably heated from the low temperature region to the high temperature region by a thermal radiation from the heating material for a low temperature region or the heating material for a high temperature region. Consequently, it is possible to suppress the generation of a difference in a temperature between the object to be burned and an ambient atmosphere.

In the microwave burning furnace according to the invention, furthermore, the heating material for a low temperature region takes a larger amount of heat generation than the amount of heat generation of the heating material for a high temperature region from the low temperature region including an ordinary temperature to a region which is less than the high temperature region to have a burning temperature, and takes an amount of heat generation which is equal to or smaller than that of the heating material for a high temperature region in the high temperature region to have the burning temperature.

In the microwave burning furnace thus constituted, the temperature rising speed in the low temperature region and the temperature rising speed in the high temperature region during the microwave heating are reduced to have a stable temperature rising range with a small fluctuation so that the temperature can be controlled. Thus, it is possible to stably carry out the burning process at a high energy efficiency from the low temperature region to the high temperature region.

In the microwave burning furnace, preferably, the heater element is constituted in such a manner that the heated object side has a main part formed by the heating material for a high temperature region and the heating material for a low temperature region is partially incorporated or the heating material for a low temperature region is constituted on the partition wall side.

In such a structure, the heater element substantially has an integral structure by the main part formed by the heating material for a high temperature region and the heating material for a low temperature region which is partially incorporated in the main part. Therefore, a heat transfer is carried out from a portion of the heating material for a low temperature region to a portion of the heating material for a high temperature region at a low temperature, and from the portion of the heating material for a high temperature region to the portion of the heating material for a low temperature region at a high temperature. As a result, the temperature is always raised equally in the whole region of the heater element.

By providing the heating material for a high temperature on a side facing the object to be heated, it is possible to eliminate a difference in a temperature from the object to be heated at a final burning temperature, thereby carrying out uniform burning.

By varying the structure of the heater element every face, that is, providing a plural-heater element having the heating material for a high temperature region and the heating material for a low temperature region on at least one face and providing the heater element for a high temperature region on the other face or removing the heater element therefrom to cause an air circulation in the burning chamber, moreover, it is possible to set the temperature in the burning chamber to be equal.

By changing the quantity of the heating unit for a low temperature region in the plural-heater element and providing different plural-heater elements depending on the intensity of the electric field of a microwave, furthermore, it is possible to effectively utilize microwave characteristics and to supply a stable microwave burning furnace.

Referring to the form of the arrangement of the heater element for the object to be heated, the arrangement is carried out over a surface for the object to be heated around the object to be heated in order to give a heat generated from the heater element to the object to be heated. The number of faces for the arrangement may be one or two, and a larger number of faces are better in order to uniformly heat the object to be heated. In some portions of the burning surface, however, a heat is transmitted through an air circulation (which is not limited to a natural convection) in addition to a radiation. For this reason, it is not necessary to arrange the heater element on all six faces. It is the most practical that the heater element is arranged on five faces and is not arranged on one residual face. The residual face may be opened to cause the air circulation or a microwave may be transmitted if necessary, thereby arranging a heat insulator formed by a material which does not automatically generate a heat.

In the case in which a plate-shaped heater element is provided around the object to be heated, for example, there is no problem even if the heater element provided on a certain face and the heater element provided on an orthogonal face adjacently thereto have a gap between their ends within a range in which the temperature of the object to be heated can be equal. A processing of forming a blanket to cover all of the surrounding faces of the object to be heated is troublesome. In the case in which a blanket to assume that a closed system is formed is to be formed, moreover, a material having a high purity is to be used in order not to generate a crack on the blanket due to a thermal expansion.

It is also possible to form a blanket for covering all of the surrounding faces of the object to be heated by using the heater element according to the invention. In this case, it is possible to obtain an advantage that such a degree as to set the ambient temperature of the object to be heated which is equal is increased.

[Advantage of the Invention]

According to the microwave burning furnace in accordance with the invention, the heating material for a low temperature region which is the formation material of the plural-heater element generates a heat at a high energy efficiency, thereby quickening a rise in an ambient temperature in the temperature rising in the low temperature region at an early stage of the heating carried out by the microwave heating. When the microwave heating is progressed so that the temperature of the heater element is raised to a predetermined high temperature region, the heating material for a high temperature region generates a heat at an original high energy efficiency, thereby raising the ambient temperature.

In other words, each of the temperature rising in the low temperature region and the temperature rising in the high temperature region can be efficiently implemented by only the microwave heating. In particular, there has been a problem in that the material of the object to be burned uses, as a raw material, alumina or silica to be the main material of ceramics having a small dielectric loss at an ordinary temperature, and the conventional apparatus has a poor energy efficiency by the microwave heating in the temperature rising in the low temperature region in the burning. On the other hand, only the microwave can fulfill the function of a heater even if the heater is not provided in the microwave burning furnace. Thus, the burning can be progressed smoothly at a high energy efficiency.

In the microwave burning furnace using the heater element constituted by at least two types of materials including the heating material for a low temperature region taking a larger amount of heat generation than the amount of heat generation of the heating material for a high temperature region from the low temperature region including the ordinary temperature to the region which is less than the high temperature region to have the burning temperature and the heating material for a high temperature region taking the amount of heat generation which is equal to or larger than that of the heating material for a low temperature region in the high temperature region to have the burning temperature, moreover, it is possible to control the temperature rising speed in the low temperature region and the temperature rising speed in the high temperature region during the microwave heating. Consequently, it is possible to suppress the generation of a difference in a temperature between the object to be burned and the ambient atmosphere from the low temperature region to the high temperature region and to implement the heating and burning with high precision which prevents the generation of a crack.

In the case in which the heater element having the main part formed by the heating material for a high temperature region and the heating material for a low temperature region incorporated partially is used, moreover, it is possible to carry out the burning by various manufacturing methods of forming a housing for embedding the heating material for a low temperature region at a proper interval in an inner-shell base metal formed previously by the heating material for a high temperature region and then incorporating the heating material for a low temperature region formed to take the shape of the housing. The inner shell thus formed can be handled as a single component. Therefore, an excellent handling property can be obtained in the assembly of the burning furnace.

In the burning chamber having a plural-heater element constituted by at least two types of heating materials including the heating material for a high temperature region and the heating material for a low temperature region and a single-heater element constituted by a single heating material of the heating material for a low temperature region or the heating material for a high temperature region, moreover, a proper heater element is provided by the electric field of a microwave in the burning chamber. Thus, it is possible to prevent the intensive heating of the microwave.

In the burning furnace in which the burning chamber has a plural-heater element constituted by at least two types of heating materials including the heating material for a high temperature region and the heating material for a low temperature region and includes at least two heater elements having different quantities of the heating material for a low temperature region in the plural-heater element, there is provided the plural-heater element including the heating material for a low temperature region having different quantities depending on the electric field of the microwave in the burning chamber. Consequently, it is possible to prevent the intensive heating of the microwave and to produce such an advantage as to relieve the distribution of the electric field of the microwave by the plural-heater element, thereby enhancing the utilization efficiency of the microwave.

By setting the plural-heater element to be removable, moreover, it is possible to regulate a rise in a temperature in the burning chamber.

DETAILED DESCRIPTION OF THE PREFERRED EMBODIMENTS

A microwave burning furnace according to a preferred embodiment of the invention will be described below in detail with reference to the accompanying drawings.

Figure 1:
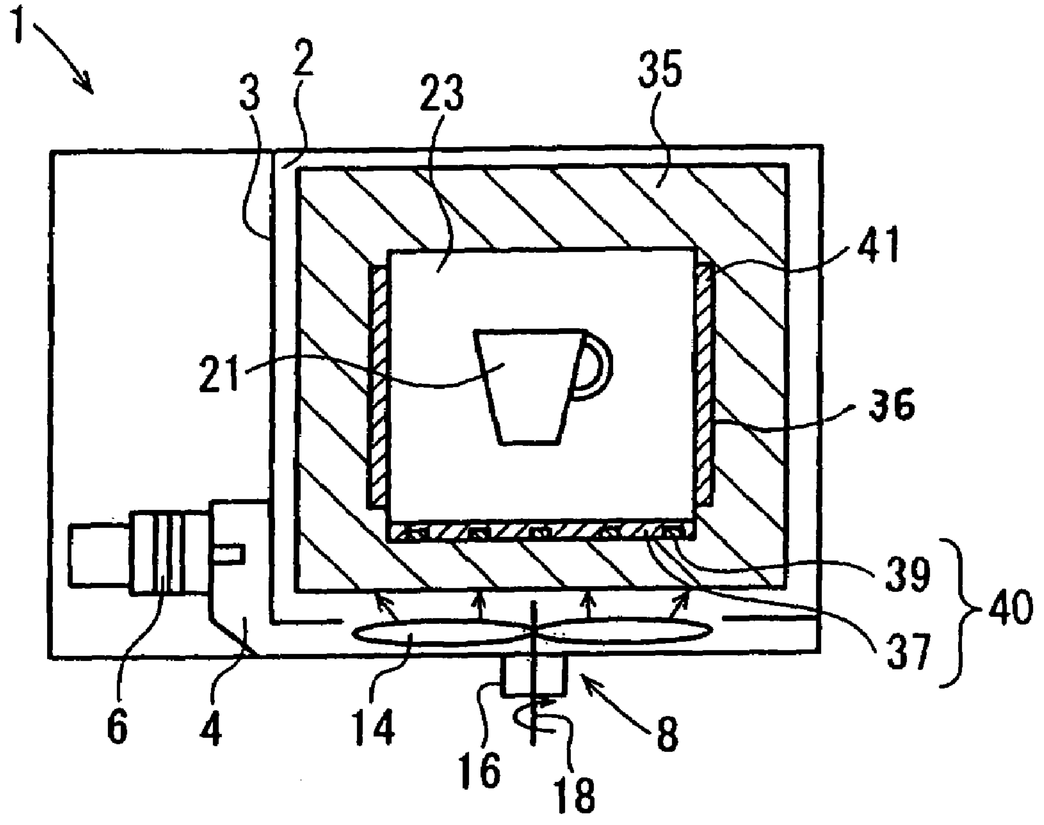
FIG. 1 is a schematic view showing a structure according to a first embodiment of a microwave burning furnace in accordance with the invention.

FIG. 1 shows a first embodiment of the microwave burning furnace according to the invention. A microwave burning furnace 1 according to the embodiment serves to burn the material of a pottery and fine ceramics by microwave heating and comprises a cavity 3 for dividing a microwave space 2, a magnetron 6 to be microwave generating means which is connected to the cavity 3 through a waveguide 4 and serves to irradiate a microwave into the cavity 3, microwave stirring means 8 for stirring the microwave irradiated into the cavity 3, a partition wall 35 formed by a heat insulator which is provided in the cavity 3 and serves to transmit a microwave, and a heater element 36 provided on the internal wall of the partition wall 35 and serving to generate a heat through the microwave.

The cavity 3 has such a structure that at least an internal surface reflects a microwave into the microwave space 2 to prevent the leakage of the microwave.

The microwave stirring means 8 includes a stirring blade 14 provided in the cavity 3, a driving motor 16 provided on the outside of the cavity 3, and a rotation transmitting shaft 18 for transmitting the rotation of the driving motor 16 to the stirring blade 14, and stirs an atmosphere in the cavity 3 by the rotation of the stirring blade 14.

The partition wall 35 is formed to divide a burning chamber 23 for providing an object 21 to be burned therein. A plural-heater element 40 is provided on the inner bottom face of the burning chamber 23 and is constituted by a heating material 37 for a high temperature region and a heating material 39 for a low temperature region, and the heating material 37 for a high temperature region is formed on the object 21 side. The partition wall 35 has a heat insulating property, and furthermore, is formed by a material for permitting the transmission of a microwave. More specifically, the partition wall 35 is formed by an alumina fiber or an alumina foam. The partition wall 35 can reduce the radiation of a heat from the burning chamber 23 or the heater element 40 to an outside when a thickness thereof is increased as shown in FIG. 2.

Figure 2:
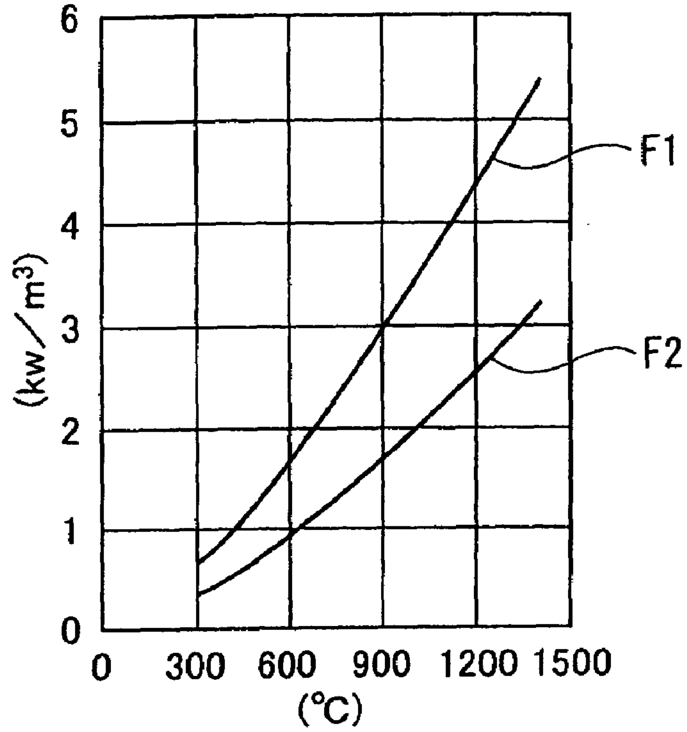
FIG. 2 is a graph showing a change in the amount of heat generation from a plural-heater element in the case in which the thickness of a heat insulating partition wall constituting the inner shell of the burning chamber of the microwave burning furnace illustrated in FIG. 1 is varied.

In FIG. 2, a curve F1 indicates a heat radiation characteristic obtained in the case in which the thickness of the partition wall 35 is small, and a curve F2 indicates a heat radiation characteristic obtained in the case in which the thickness of the partition wall 35 is set to be greater than that in the case of the curve F1. The greater thickness of the partition wall 35 can more enhance the heat insulating property. In FIG. 2, an axis of abscissa indicates the temperature of the burning chamber 23 and an axis of ordinate indicates the amount of a heat discharged from the burning chamber 23 to the outside.

The plural-heater element 40 is provided on the inner bottom face of the burning chamber 23, and a single-heater element 41 constituted by a heating material for a high temperature region is provided on a vertical surface and the heater element is not provided on an upper surface.

The plural-heater element 40 provided on the inner bottom face includes the heating material 37 for a high temperature region which automatically generates a heat mainly in the high temperature region to have a burning temperature, and the heating material 39 for a low temperature region which automatically generates a heat mainly in the low temperature region including an ordinary temperature, and is formed by a dielectric material capable of automatically generating a heat through a microwave irradiated from the outside and transmitting a part of the irradiated microwave to the object 21 to be burned in the burning chamber 23.

Figure 3:
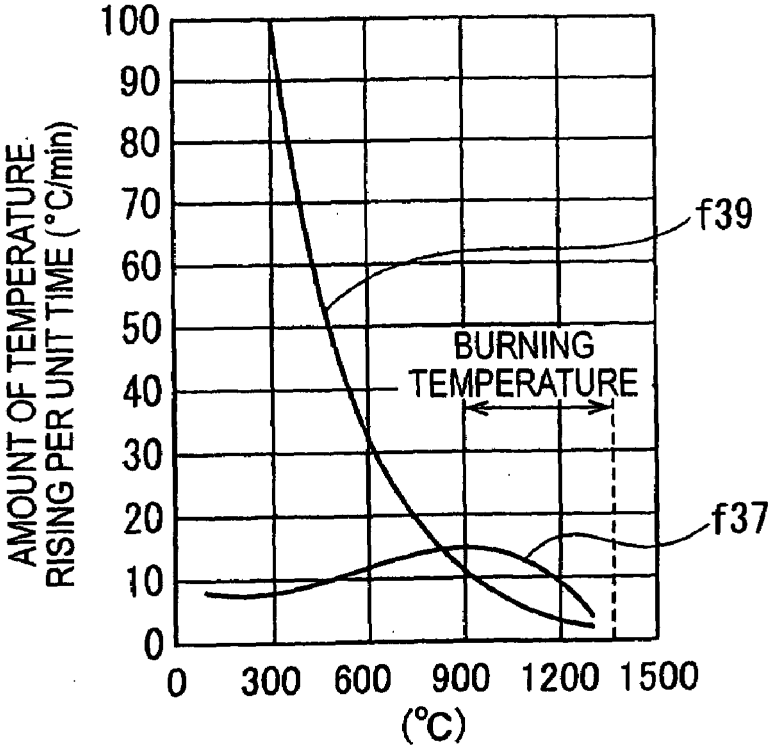
FIG. 3 is a graph showing the correlation of the heating temperatures of a heating material for a high temperature region and a heating material for a low temperature region which constitute the heater element provided in the burning chamber of the microwave burning furnace illustrated in FIG. 1 with an amount of temperature rising per unit time.

As shown in FIG. 3, the heating material 39 for a low temperature region takes a larger amount of heat generation than the amount of heat generation of the heating material 37 for a high temperature region from the low temperature region including an ordinary temperature to a region which is less than the high temperature region to have a burning temperature, and a dielectric material to have the amount of heat generation which is equal to or smaller than that of the heating material 37 for a high temperature region is selected in the high temperature region to have the burning temperature.

In FIG. 3, a curve f37 indicates the correlation of a heating temperature with the amount of temperature rising per unit time in the case in which a mullite type material is used as the heating material 37 for a high temperature region, and a curve f39 indicates the correlation of a heating temperature with the amount of temperature rising per unit time in the case in which silicon carbide is used as the heating material 39 for a low temperature region.

The plural-heater element 40 is formed by providing a housing for embedding the heating material 39 for a low temperature region at a proper interval (preferably, a constant interval) in a plate-shaped inner-shell base metal formed previously by the heating material 37 for a high temperature region and then embedding the heating material 39 for a low temperature region which is molded to take the shape of the housing, and a main part is formed by the heating material 37 for a high temperature region and the heating material 39 for a low temperature region is incorporated in an outer peripheral surface thereof in a partial embedding state.

In the heating material 37 for a high temperature region, it is preferable that the amount of heat generation per unit volume by the microwave heating is larger than the amount of heat generation per unit volume of the object 21 to be burned. More specifically, a mullite type material, a silicon nitride type material and alumina can be taken as an example. A material having a proper amount of heat generation is selected depending on the temperature characteristic of the object 21 to be burned.

In the heating material 37 for a high temperature region, a small amount of a metal oxide (for example, magnesia, zirconia or iron oxide) or an inorganic material (for example, silicon carbide) may be added to the material described above, thereby regulating the heating characteristic.

In the heating material 39 for a low temperature region, there is used a material having an excellent microwave absorption in which the amount of heat generation per unit volume by a microwave is several to several tens times as much as the amount of heat generation per unit volume of a material constituting the object 21 to be burned at an ordinary temperature and is equal to or smaller than the amount of heat generation of the heating material 37 for a high temperature region in the high temperature region to have a burning temperature. More specifically, magnesia, zirconia, iron oxide and silicon carbide can be taken as an example.

In the embodiment, the heating material 39 for a low temperature region is a chip taking the shape of a sphere or a rectangular parallelepiped and having a small dimension, and is provided in a state in which it is embedded in the external surface of a wall surface by the heating material 37 for a high temperature region.

According to the microwave burning furnace 1, when the microwave is irradiated from the magnetron 6 to be the microwave generating means onto the plural-heater element 40, the temperature of the plural-heater element 40 is raised by the microwave heating, and at the same time, the temperature of the object 21 to be burned in the burning chamber 23 divided by the partition wall 35 is raised by the heating of the microwave transmitted through the plural-heater element 40.

In temperature rising in the low temperature region at an early stage of the heating through the microwave heating during the burning process, the heating material 39 for a low temperature region in the heater element 40 generates a heat at a high energy efficiency so that a rise in an ambient temperature is quickened. When the microwave heating is progressed so that the temperature of the heating material 37 for a high temperature region in the heater element is raised to a predetermined high temperature region, the heating material 37 for a high temperature region generates a heat by an original high energy effect so that the ambient temperature is raised.

Moreover, surfaces having the plural-heater element 40 and the single-heater element 41 and a surface having no heater element are present in the burning chamber 23. The temperature of the inner part of the burning chamber 23 is uniformly raised by an air circulation caused by a difference in a temperature which is made during temperature rising. Furthermore, the temperature of the surface having no heater element is also raised uniformly up to a burning temperature by the air circulation.

Accordingly, each of the temperature rising for a low temperature region and the temperature rising for a high temperature region can be implemented efficiently through only the microwave heating and it is possible to shorten a time required for temperature rising from the low temperature region to the high temperature region, and furthermore, the burning can be progressed smoothly at a high energy efficiency also in the case in which the material of the object 21 to be burned uses, as a raw material, alumina or silica to be the main material of ceramics having a small dielectric loss at an ordinary temperature, for example.

In addition, the temperature rising in the low temperature region and the temperature rising in the high temperature region are carried out at high energy efficiencies by the heating material 39 for a low temperature region and the heating material 37 for a high temperature region respectively, and the ambient temperature is stably heated from the low temperature region to the high temperature region by a heat radiation from the heating material 39 for a low temperature region or the heating material 37 for a high temperature region. Consequently, it is possible to suppress the generation of a difference in a temperature between the object 21 to be burned and an ambient atmosphere.

Accordingly, it is possible to suppress the radiation of a heat from the object 21 to be burned from the low temperature region to the high temperature region, thereby preventing the generation of a temperature gradient between a surface and an inner part of the object 21 to be burned.

Therefore, a crack can be prevented from being generated due to the temperature gradient. Thus, burning of good quality can be carried out.

Moreover, the structure serves to enhance the energy efficiencies of both the temperature rising in the low temperature region and the temperature rising in the high temperature region by forming the plural-heater element 40 with two types of dielectric materials of the heating material 39 for a low temperature region and the heating material 37 for a high temperature region. Therefore, it is sufficient that the partition wall 35 itself is single. Thus, it is possible to decrease the number of components.

Furthermore, both the temperature rising in the low temperature region and the temperature rising in the high temperature region are managed by only the microwave heating. As compared with a conventional burning furnace to which a heater is added for the temperature rising in the low temperature region, therefore, it is not necessary to provide a power supply for the heater separately from the microwave generating means and it is possible to reduce the capacity of the power supply, thereby saving an energy. Furthermore, it is not necessary to draw a lead wire for supplying a power to the heater into the microwave space 2, and an attachment structure for causing the leakage or discharge of a microwave is not generated on the cavity for dividing the microwave space 2. Consequently, it is possible to reduce a cost by simplifying the structure of the burning furnace and decreasing the number of the components.

As described above, moreover, the materials of the heating material 39 for a low temperature region and the heating material 37 for a high temperature region are selected in such a manner that the heating material 39 for a low temperature region takes a larger amount of heat generation than the amount of heat generation of the heating material 37 for a high temperature region from the low temperature region including the ordinary temperature to the region which is less than the high temperature region to have the burning temperature and takes an amount of heat generation which is equal to or smaller than the amount of heat generation of the heating material 37 for a high temperature region in the high temperature region to have the burning temperature. Consequently, it is possible to control a temperature rising speed in the low temperature region and a temperature rising speed in the high temperature region during the microwave heating. Thus, it is possible to suppress the generation of a difference in a temperature between the object to be burned and the ambient atmosphere from the low temperature region to the high temperature region and to implement the heating and burning with high precision which prevents the generation of a crack. Furthermore, it is also possible to shorten a time required for the burning.

In the embodiment, moreover, the heating material 39 for a low temperature region takes the shape of a small chip and has such a structure as to be embedded in the inner-shell base metal formed by the heating material 37 for a high temperature region. However, the structure incorporating the heating material 39 for a low temperature region is not restricted to the embodiment but structures shown in FIGS. 4 and 5 can also be employed.

Figure 4:
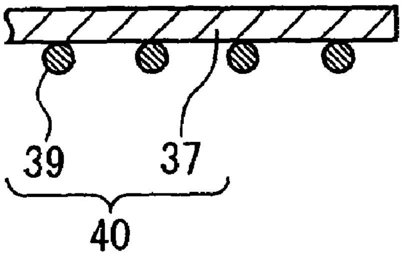
FIG. 4 is a schematic view showing the structure of a heater element according to a second embodiment of the microwave burning furnace in accordance with the invention.

Referring to the structure shown in FIG. 4, a small component formed by the heating material 39 for a low temperature region is provided on the external surface of the inner shell 41 formed previously by the heating material 37 for a high temperature region.

Figure 5:
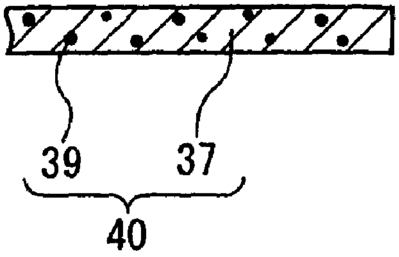
FIG. 5 is a schematic view showing the structure of a heater element according to a third embodiment of the microwave burning furnace in accordance with the invention.

Referring to the structure shown in FIG. 5, the heating material 37 for a high temperature region and the heating material 39 for a low temperature region are mixed in a predetermined compounding ratio as the component of a fluid raw material before the formation of the inner shell, and the raw material is uniformly stirred to form a raw material in which the heating material 39 for a low temperature region is partially present, and the raw material is formed to take a predetermined shape by pressing and burning.

Figure 6:
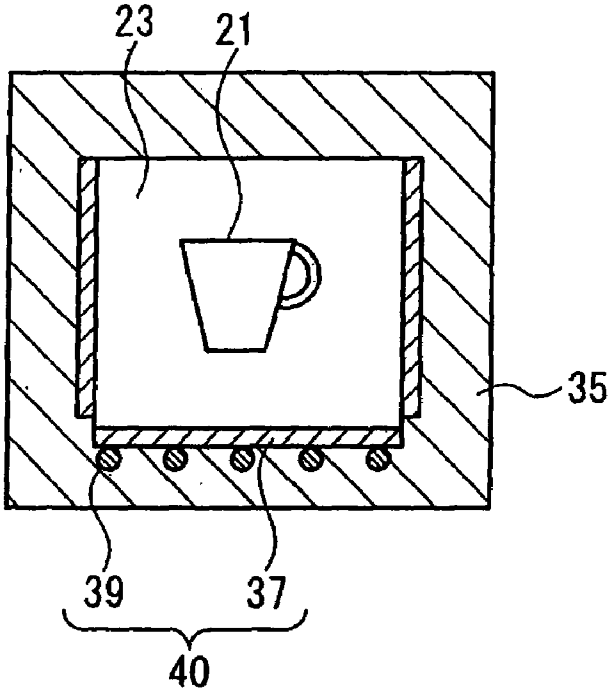
FIG. 6 is a schematic view showing a heater element according to a fourth embodiment of the microwave burning furnace in accordance with the invention.
Figure 7:
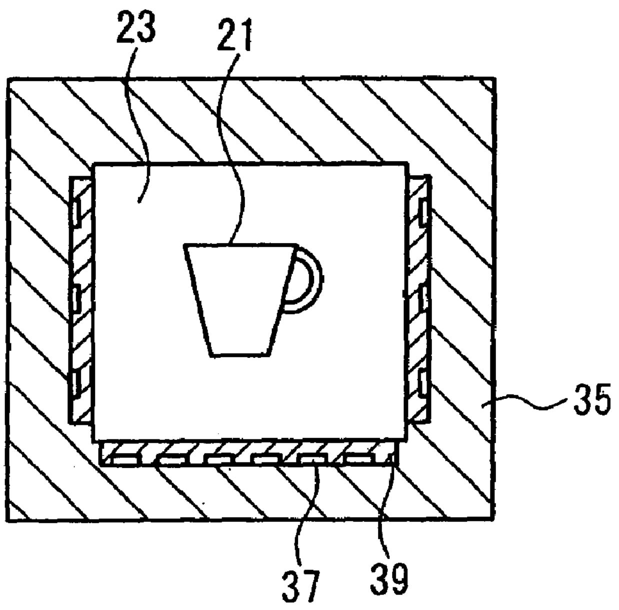
FIG. 7 is a schematic view showing a heater element according to a fifth embodiment of the microwave burning furnace in accordance with the invention.
Figure 8:
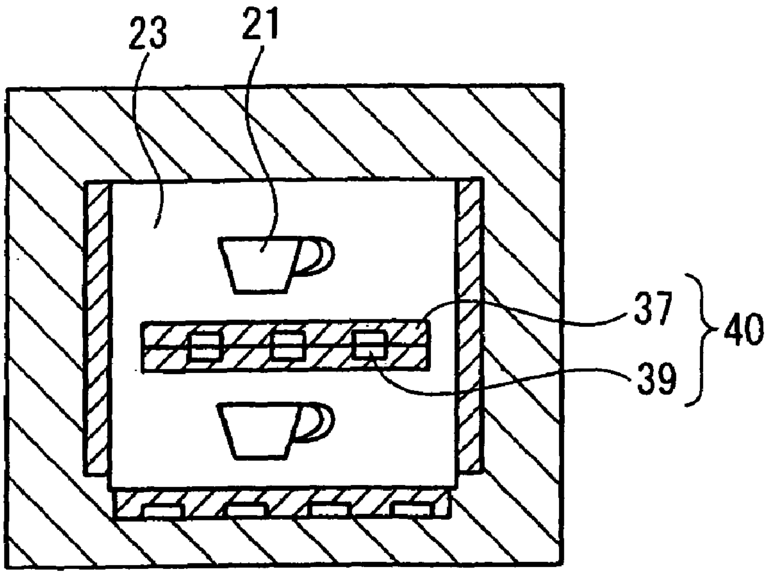
FIG. 8 is a schematic view showing a heater element according to a sixth embodiment of the microwave burning furnace in accordance with the invention.

In any case, the plural-heater element setting the heating material 37 for a high temperature region to be a main part and partially incorporating the heating material 39 for a low temperature region into the main part can be formed by various methods, and the plural-heater element thus formed can be handled as a single component. Therefore, it is possible to obtain an excellent handling property in the assembly of the burning furnace. FIGS. 6 and 7 are schematic views showing the microwave burning furnace incorporating the heater element.

The heating material 39 for a low temperature region which is provided on the external surface side of the plural-heater element 40 is more excellent in that the heating unevenness of the object 21 to be burned can be reduced.

This can diffuse a heat generated from the heating material 39 for a low temperature region onto the internal surface of the heater element by a heat conduction or a heat radiation to eliminate a temperature unevenness over the internal surface of the plural-heater element, that is, can set the temperature of the inner peripheral surface of the plural-heater element 40 to be uniform with respect to the object 21 to be burned, thereby preventing the generation of a local temperature gradient over an atmosphere in the burning chamber 23.

The respective materials of the heating material 37 for a high temperature region and the heating material 39 for a low temperature region are selected in such a manner that proper amounts of heat generation can be obtained depending on the material characteristic of the object 21 to be burned. By varying the ratio of the heating material 39 for a low temperature region to be incorporated in the heating material 37 for a high temperature region in addition to the selection of the respective materials, it is possible to change the amount of heat generation of the plural-heater element.

Figure 9:
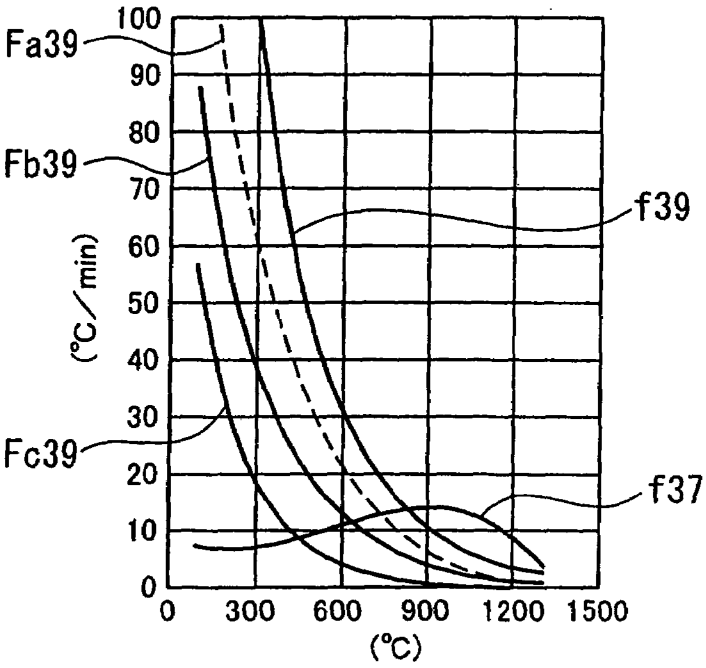
FIG. 9 is a graph showing a difference in a temperature rising characteristic for a variation in the component of a heating material for a low temperature region in the heater element of the microwave burning furnace according to the invention.

Curves Fa39, Fb39 and Fc39 in FIG. 9 indicate temperature rising characteristics obtained in the case in which the amount of the equipment of the heating material 39 for a low temperature region is gradually decreased as compared with the case of f39. By regulating the quantity of a material to be incorporated as the heating material 39 for a low temperature region, it is possible to obtain a desirable temperature rising characteristic.

More specifically, it is possible to form the plural-heater element 40 having an optional temperature rising characteristic by selecting the materials of the heating material 37 for a high temperature region and the heating material 39 for a low temperature region, and furthermore, properly heating the quantity of the heating material 39 for a low temperature region to be incorporated in the heating material 37 for a high temperature region. Accordingly, the plural-heater element 40 having the quantities of the heating material for a low temperature region which are different from each other is provided in the burning chamber depending on the intensity of the electric field of a microwave. By providing the plural-heater element 40 having a small quantity of heating materials for a low temperature region or the single-heater element 41 in a portion having a high electric field and providing the plural-heater element 40 having a large quantity of the heating material for a low temperature region in a portion having a low electric field, it is possible to eliminate troubles such as a hot spot and a spark which are caused by the electrostatic focusing of the microwave.

Figure 10:
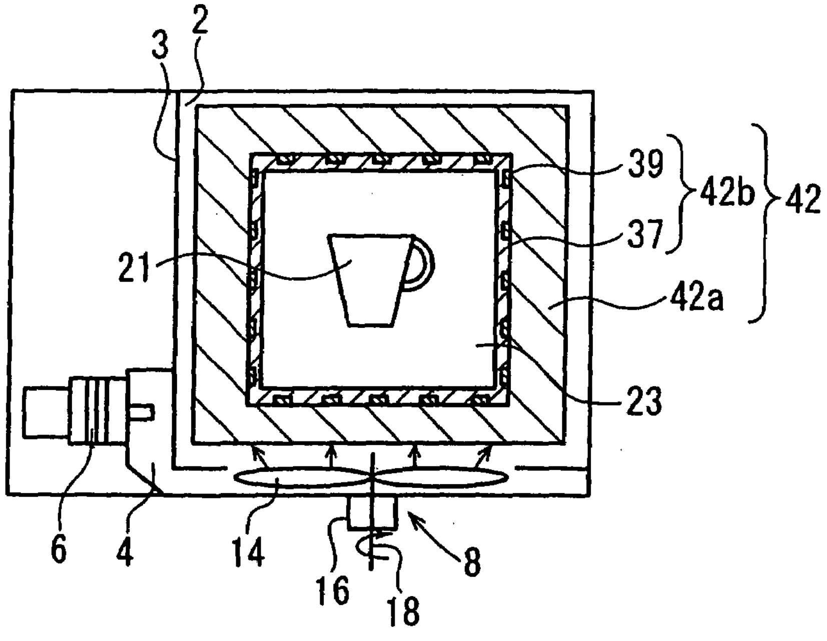
FIG. 10 is a schematic view showing a structure according to a seventh embodiment of the microwave burning furnace in accordance with the invention.
Figure 11:
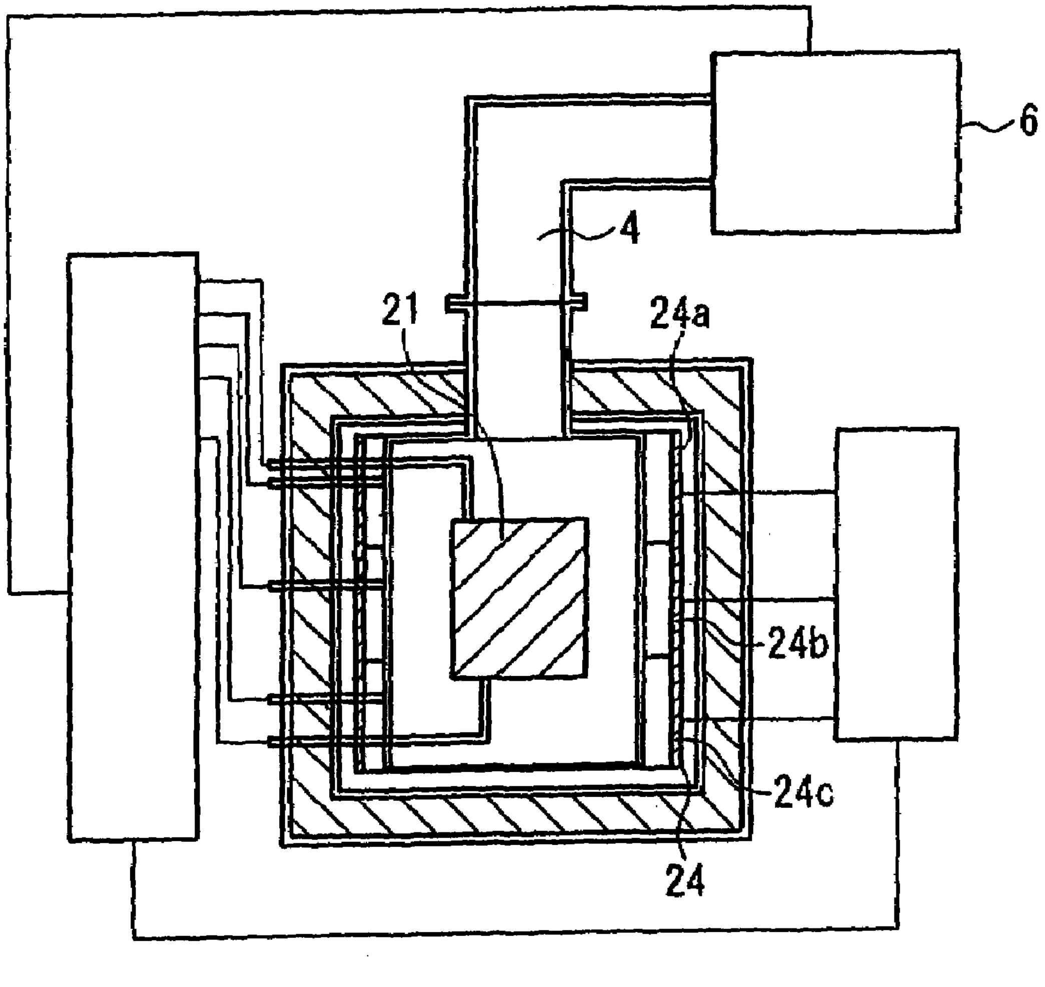
PRIOR ART FIG. 11
FIG. 11 is a schematic view showing the structure of a conventional microwave burning furnace of such a type as to provide a heater therein.
Figure 12A:
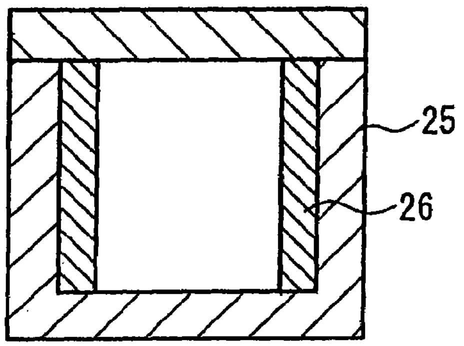
PRIOR ART FIG. 12A
FIG. 12 is a schematic view showing the structure of a conventional microwave burning furnace of such a type as to include a cylindrical heating unit for automatically generating a heat through a microwave.
Figure 12B:
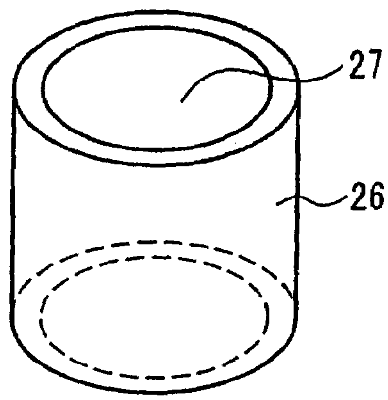
PRIOR ART FIG. 12B
Figure 13:
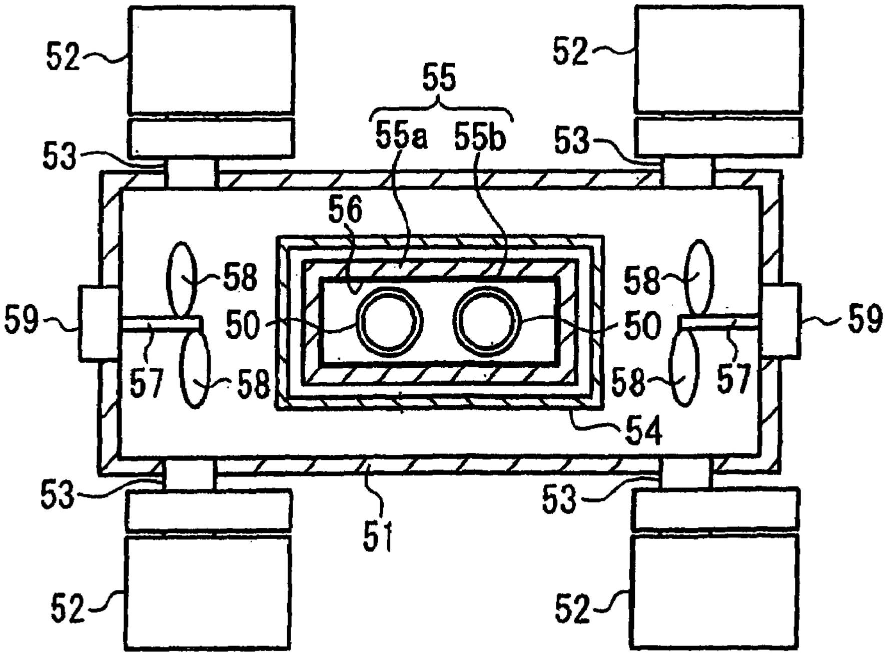
PRIOR ART FIG. 13
FIG. 13 is a schematic view showing the structure of a conventional microwave burning furnace of such a type as to include the blanket of a heating unit for automatically generating a heat through a microwave which surrounds an object to be heated.

FIG. 10 shows a seventh embodiment of the microwave burning furnace according to the invention.

A microwave burning furnace 31 according to the embodiment serves to burn the material of a pottery and fine ceramics by microwave heating and comprises a cavity 3 for dividing a microwave space 2, a magnetron 6 to be microwave generating means which is connected to the cavity 3 through a waveguide 4 and serves to irradiate a microwave into the cavity 3, microwave stirring means 8 for stirring the microwave irradiated into the cavity 3, and a blanket 42 provided in the cavity 3 and surrounding an object 21 to be burned.

The cavity 3 has such a structure that at least an internal surface reflects a microwave into the microwave space 2 to prevent the leakage of the microwave.

The microwave stirring means 8 includes a stirring blade 14 provided in the cavity 3, a driving motor 16 provided on the outside of the cavity 3, and a rotation transmitting shaft 18 for transmitting the rotation of the driving motor 16 to the stirring blade 14, and stirs an atmosphere in the cavity 3 by the rotation of the stirring blade 14.

The blanket 42 is formed to divide a burning chamber 23 for providing the object 21 to be burned therein. The blanket 42 dividing the burning chamber 23 has a two-layer structure including an outer shell 42*a* and an inner shell 42*b*.

The outer shell 42*a* has a heat insulating property, and furthermore, is formed by a material for permitting the transmission of a microwave. More specifically, the outer shell 42*a* is formed by an alumina fiber or an alumina foam.

The outer shell 42*a* can reduce the radiation of a heat from the burning chamber 23 or the blanket 42 to an outside when a thickness thereof is increased as shown in FIG. 2.

In FIG. 2, a curve F1 indicates a heat radiation characteristic obtained in the case in which the thickness of the outer shell 42*a* is small, and a curve F2 indicates a heat radiation characteristic obtained in the case in which the thickness of the outer shell 42*a* is set to be greater than that in the case of the curve F1. The greater thickness of the outer shell 42*a* can more enhance the heat insulating property. In FIG. 2, an axis of abscissa indicates the temperature of the burning chamber 23 and an axis of ordinate indicates the amount of a heat discharged from the blanket 42 to the outside.

The inner shell 42*b* is formed by a dielectric material capable of automatically generating a heat through a microwave irradiated from the outside and transmitting a part of the irradiated microwave to the object 21 to be burned in the burning chamber 23. The inner shell 42*b* can be constituted by the heater elements shown in FIGS. 4 and 5.

In more detail, the inner shell 42*b* includes a heating material 37 for a high temperature region which automatically generates a heat mainly in the high temperature region to have a burning temperature through the irradiation of a microwave, and a heating material 39 for a low temperature region which automatically generates a heat mainly in the low temperature region including an ordinary temperature.

As shown in FIG. 3, the heating material 39 for a low temperature region takes a larger amount of heat generation than the amount of heat generation of the heating material 37 for a high temperature region from the low temperature region including an ordinary temperature to a region which is less than the high temperature region to have a burning temperature, and a dielectric material to have the amount of heat generation which is equal to or smaller than the amount of heat generation of the heating material 37 for a high temperature region is selected in the high temperature region to have the burning temperature.

In FIG. 3, a curve f37 indicates the correlation of a heating temperature with the amount of temperature rising per unit time in the case in which a mullite type material is used as the heating material 37 for a high temperature region, and a curve f39 indicates the correlation of a heating temperature with the amount of temperature rising per unit time in the case in which silicon carbide is used as the heating material 39 for a low temperature region.

Since the invention can uniformly heat and burn an object to be burned without generating a temperature gradient on the object to be burned when heating the object to be burned through a microwave and can prevent the generation of a crack or a fracture, it can be used for burning potteries and ceramics.

What is claimed is:

1. A microwave burning furnace comprising:

a housing constituted by a metal on which a microwave is to be irradiated;

a metallic door provided in the housing;

a burning chamber provided in the housing and surrounded by a material having a low microwave absorption characteristic and a high heat insulating property; and microwave generating means for generating the microwave, wherein the burning chamber includes a heater element constituted by at least two types of heating materials having a heating material for a high temperature region which automatically generates a heat mainly in the high temperature region to have a burning temperature by an irradiation of a microwave and a heating material for a low temperature region which automatically generates a heat mainly in the low temperature region, wherein said heater element is configured to effectively prevent the generation of a temperature gradient in an object to be burned in a burning process.

2. The microwave burning furnace according to claim 1, wherein the heater element is constituted by at least two types of materials including a heating material for a low temperature region which takes a larger amount of heat generation than an amount of heat generation of the heating material for a high temperature region from the low temperature region to a region which is less than the high temperature region to have a burning temperature and a heating material for a high temperature region taking an amount of heat generation which is equal to or larger than the amount of heat generation of the heating material for a low temperature region in the high temperature region to have the burning temperature.

3. The microwave burning furnace according to claim 1, wherein the heater element has a main part formed by the heating material for a high temperature region and the heating material for a low temperature region is partially incorporated therein.

4. The microwave burning furnace according to claim 2, wherein the heater element has a main part formed by the heating material for a high temperature region and the heating material for a low temperature region is partially incorporated therein.

5. The microwave burning furnace according to any of claims 1 to 4, wherein the burning chamber has a plural-heater element constituted by at least two types of heating materials having a heating material for a high temperature region and a heating material for a low temperature region, and a single-heater element constituted by a single heating material to be the heating material for a low temperature region or the heating material for a high temperature region.

6. The microwave burning furnace according to any of claims 1 to 4, wherein the burning chamber has a plural-heater element constituted by at least two types of heating materials having a heating material for a high temperature region and a heating material for a low temperature region and at least two plural-heater elements having different quantities of the heating material for a low temperature region in the plural-heater element.

7. The microwave burning furnace according to any of claims 1 to 4, wherein the heater element is provided in the burning chamber and is constituted removably.

8. The microwave burning furnace according to any of claims 1 to 4, wherein the heater element forms a configuration of a blanket carrying out a division to surround an object to be heated.

* * * * *